(12) United States Patent
Nakagawa et al.

(10) Patent No.: US 10,919,143 B2
(45) Date of Patent: Feb. 16, 2021

(54) DEVICE AND METHOD FOR DETECTING ABNORMALITY OF JOINT OF ROBOT

(71) Applicants: FANUC CORPORATION, Yamanashi (JP); TOKYO INSTITUTE OF TECHNOLOGY, Tokyo (JP)

(72) Inventors: Hiroshi Nakagawa, Yamanashi (JP); Kenichiro Abe, Yamanashi (JP); Yunfeng Wu, Yamanashi (JP); Hikaru Yamashiro, Yamanashi (JP); Hideo Matsui, Yamanashi (JP); Soichi Arita, Yamanashi (JP); Yukio Takeda, Tokyo (JP); Masumi Ohno, Tokyo (JP)

(73) Assignees: FANUC CORPORATION, Yamanashi (JP); TOKYO INSTITUTE OF TECHNOLOGY, Tokyo (JP)

( * ) Notice: Subject to any disclaimer, the term of this patent is extended or adjusted under 35 U.S.C. 154(b) by 50 days.

(21) Appl. No.: 16/269,568

(22) Filed: Feb. 7, 2019

(65) Prior Publication Data

US 2019/0247998 A1 Aug. 15, 2019

(30) Foreign Application Priority Data

Feb. 14, 2018 (JP) .............................. JP2018-024055

(51) Int. Cl.
*B25J 17/00* (2006.01)
*B25J 9/02* (2006.01)
(Continued)

(52) U.S. Cl.
CPC ........... *B25J 9/0051* (2013.01); *B25J 9/1633* (2013.01); *B25J 9/1664* (2013.01); *B25J 9/1674* (2013.01);
(Continued)

(58) Field of Classification Search
CPC ... B25J 9/003; B25J 9/0051; B25J 9/16; B25J 9/1628; B25J 9/1633; B25J 9/1641;
(Continued)

(56) References Cited

U.S. PATENT DOCUMENTS 8,132,481 B2 * 3/2012 Nishida ................. B25J 13/087
414/735
8,948,915 B2 * 2/2015 Nakanishi ............. B25J 9/1623
700/258
(Continued)

FOREIGN PATENT DOCUMENTS

JP 2002-529258 A 9/2002
JP 2005-186183 A 7/2005
(Continued)

OTHER PUBLICATIONS

Ohno, Masumi et al., "Identification of Joint Clearances in Parallel Robots by Using Embedded Sensors", DuEPublico Duisburg-Essen Publications online, Feb. 13, 2018, IFToMM D-A-Ch Conference 2018, 3pp.

*Primary Examiner* — Adam D Rogers
(74) *Attorney, Agent, or Firm* — Hauptman Ham, LLP (57) ABSTRACT

A device and method for judging the presence or absence of an abnormal clearance between paring elements of a passive joint of a robot. The device has sections configured to: calculate a score for each motion path, wherein the score is increased when the paring elements of an objective pair collide with each other and is decreased when the paring elements of the other pair collide with each other; generate a robot motion for moving the robot along the motion path having the score not lower than a predetermined threshold; measure a drive torque or a current value of a motor when the robot is moved according to the generated robot motion; calculate an index value based on a magnitude of variation of the measured drive torque or current value; and judge as (Continued)

to whether the abnormal clearance exists in the objective pair, based on the index value.

8 Claims, 7 Drawing Sheets

(51) Int. Cl.
  *B25J 9/10* (2006.01)
  *B25J 9/16* (2006.01)
  *B25J 9/00* (2006.01)
  *B25J 17/02* (2006.01)
(52) U.S. Cl.
  CPC ....... *B25J 17/0266* (2013.01); *B25J 17/0275* (2013.01)
(58) Field of Classification Search
  CPC .... B25J 9/1664; B25J 9/1674; B25J 17/0266; B25J 17/0275
  See application file for complete search history.

(56) References Cited

U.S. PATENT DOCUMENTS

| 9,737,985 | B2 * | 8/2017 | Wu | B25J 9/003 |
| 10,350,753 | B2 * | 7/2019 | Abe | B25J 9/1664 |

FOREIGN PATENT DOCUMENTS

| JP | 2006-281421 A | | 10/2006 | |
| JP | 2014046406 A | * | 3/2014 | ............ B25J 9/0051 |
| JP | 2017-13160 A | | 1/2017 | |
| JP | 2017-56507 A | | 3/2017 | |
| WO | 00/27597 A1 | | 5/2000 | |

* cited by examiner

Model (a)

FIG. 7b

Condition: F>0

Model (b)

FIG. 7c

Condition: $f \cdot \ddot{d} < 0$

Model (c)

FIG. 8

Table 1  The values added to score

| Simulation results | u |
|---|---|
| $c_{i,j,k}=1, I_{i,j,k}=1 ((i,j,k)=(i',j',k'))$ | 0 |
| $c_{i,j,k}=1, I_{i,j,k}=0 ((i,j,k)=(i',j',k'))$ | $-1 \times 2^{-11}$ |
| $c_{i,j,k}=1, I_{i,j,k}=1 ((i,j,k) \neq (i',j',k'))$ | $-0.3 \times 2^{-11}$ |
| $c_{i,j,k}=1, I_{i,j,k}=0 ((i,j,k) \neq (i',j',k'))$ | 0 |
| $c_{i,j,k}=0$ | 0 |

$I_{i,j,k} = \begin{cases} 0 \ (S_{i,j,k}: \text{model (b)}) \\ 1 \ (S_{i,j,k}: \text{model (c)}) \end{cases}$

DEVICE AND METHOD FOR DETECTING ABNORMALITY OF JOINT OF ROBOT

RELATED APPLICATIONS

The present application claims priority of Japanese Application Number 2018-024055, filed on Feb. 14, 2018, the disclosure of which is hereby incorporated by reference herein in its entirety.

BACKGROUND OF THE INVENTION

1. Field of the Invention

The present invention relates to a device and method for detecting an abnormal clearance at a joint of a robot.

2. Description of the Related Art

As an example of a robot having a link mechanism, a parallel link robot having a delta-type parallel link mechanism for positioning a movable part having an end effector in three-dimensions is well known. The delta-type parallel link robot has a base part, a movable part, and kinematic chains for connecting the movable part to the base part. The kinematic chain is constituted by a drive link and a passive (driven) link.

In many cases, the parallel link robot has three kinematic chains, and the movable part can move with three degrees-of-freedom (X, Y, Z) by individually controlling the motion of each drive link.

Generally, the passive link and the drive link are connected via ball joints having three degrees-of-freedom, and the passive link and the movable part are also connected via ball joints having three degrees-of-freedom. For example, in a well-known configuration of a ball joint, in which a ball is geometrically separated from a housing, and the ball is biased toward the housing by an elastic material such as a spring (e.g., see JP 2002-529258 A). Further, a joint of a parallel link robot, having a link-ball structure in which a ball and a hosing are unified so that the ball is not easily separated from the housing is well known (e.g., see JP 2014-046406 A).

On the other hand, it is a conventional technique to detect an abnormality of the motion of a robot at an early stage, and then limit a decrease in a working ratio of the robot. For example, there is a well-known abnormality judging method including: calculating an estimated current position based on a command position by a low-pass filter having a time constant corresponding to an inverse number of a position loop gain; calculating an absolute value of a difference between the estimated current position and an actual current position detected by an encoder attached to a servomotor; calculating a total observer feedback quantity based on a torque command value for driving the servomotor, a differential value of the actual position and a known disturbance torque; calculating an abnormality detection threshold based on the total observer feedback quantity and an estimated velocity obtained by differentiating the estimated current position; and judging that an abnormality occurs in the robot when the absolute value is larger than the abnormality detection threshold (e.g., see JP 2005-186183 A).

Further, there is a well-known abnormality detecting method including: measuring a natural frequency of a robot arm with respect to a joint of a robot body; setting a constant velocity motion, in which the robot arm resonates most by vibration generated by a drive motor and a speed reducer, as an operating condition for detecting an abnormality of the robot body; and judging that an abnormality occurs in the robot body when a variable torque value calculated from a motor torque value corrected by using a temperature sensor, provided to the drive motor or the speed reducer, exceeds a predetermined threshold (e.g., see JP 2006-281421 A).

On the other hand, there is a well-known parallel link robot, having a sensor for detecting an inclination of an end plate corresponding to a final output of the robot, wherein it can be detected that a connection or coupling between links of at least one connected portions of links connected by ball joints is released, based on an output value of the sensor (e.g., see JP 2017-056507 A).

Further, there is a well-known detection device, wherein a ball joint has an inner path which opens at a surface of a spherical head, and it can be judged as to whether or not a connection of the all joint is released, based on a detection value of the pressure in the inner path (e.g., see JP 2017-013160 A).

In the structure in which the ball and the housing are geometrically separated from each other, when an unexpectedly high speed motion or an unintentional collision occurs, the joint may be disassembled due to a lack of a binding force for biasing the ball toward the housing in the joint of the passive link.

On the other hand, in the link-ball structure in which the ball and the hosing are unified, it is expected that the ball and the housing are not easily separated from each other due to the mechanical connection, even when the collision, etc., occurs. However, when the link-ball structure is used, a clearance is generated between the ball and the housing, whereby the positional accuracy of the movable part of the robot may be deteriorated, and/or the vibration of the movable part may be increased. Due to the deterioration of the positional accuracy and/or the increase in the vibration, a handling operation or assembling operation of the robot may not be correctly performed, whereby a serious problem such as a stoppage of a production system or decrease in a working ratio of the system may occur. Therefore, when the clearance of the ink ball is abnormal, an operator should be promptly notified of such an abnormal state.

A conventional method for judging an abnormality by using a motor torque is considered to be inadequate to detect the abnormality of the ball joint of the delta-type parallel link robot, for the following reasons: in normal, the ball joint of the delta-type parallel link robot is passively operated in accordance with the position of the robot; the ball joint is arranged at a position relatively away from a drive motor; and it is difficult to specify which joint among the plural ball joints has an abnormality.

In addition, in a conventional method for detecting that the connection by the ball joint is released, it is difficult to detect that the clearance between the ball and the housing (or socket) is increased, when the ball joint has a structure by which the connection by the ball joint cannot be easily released.

SUMMARY OF THE INVENTION

One aspect of the present disclosure is an abnormality detecting device for detecting an abnormal clearance between paring elements of a pair connected to a passive link of a robot, the robot having: a drive link driven by a motor; a plurality of passive links driven by a motion of the drive link; and a plurality of pairs respectively connected to the plurality of passive links, the abnormality detecting device comprising: a score calculating section configured to execute a simulation in which the robot is moved along each of predetermined plural motion paths, and calculate a score with respect to each of the motion paths, wherein the score is increased when the paring elements of an objective pair collide with each other and the score is decreased when the paring elements of the pair other than the objective pair collide with each other, and wherein the objective pair is preliminarily designated among the plurality of pairs so as to judge as to whether or not the objective pair has the abnormal clearance; a motion generating section configured to generate a robot motion for moving the robot along the motion path having the score not lower than a predetermined threshold, among the plurality of motion paths; a measuring section configured to measure a drive torque or a current value of the motor when the robot is moved in accordance with the generated robot motion; an index calculating section configured to calculate an index value based on a magnitude of variation of a value relating to the drive torque or the current value measured by the measuring section; and a judging section configured to judge as to whether or not the abnormal clearance exists between the paring elements of the objective pair, based on a magnitude of the index value.

Another aspect of the present disclosure is an abnormality detecting device for detecting an abnormal clearance between paring elements of a pair connected to a passive link of a robot, the robot having: a drive link driven by a motor; a plurality of passive links driven by a motion of the drive link; and a plurality of pairs respectively connected to the plurality of passive links, the abnormality detecting device comprising: a simulation executing section configured to execute a simulation in which the robot is moved along each of predetermined plural motion paths, and determine a motion path among the plural motion paths, in which only the paring elements of an objective pair collide with each other when it is assumed that a clearance exists between the paring element of the objective pair, wherein the objective pair is preliminarily designated among the plurality of pairs so as to judge as to whether or not the objective pair has the abnormal clearance; a motion generating section configured to generate a robot motion for moving the robot along the motion path determined by the simulation executing section; a measuring section configured to measure a drive torque or a current value of the motor when the robot is moved in accordance with the generated robot motion; an index calculating section configured to calculate an index value based on a magnitude of variation of a value relating to the drive torque or the current value measured by the measuring section; and a judging section configured to judge as to whether or not the abnormal clearance exists between the paring elements of the objective pair, based on a magnitude of the index value.

Still another aspect of the present disclosure is an abnormality detecting method for detecting an abnormal clearance between paring elements of a pair connected to a passive link of a robot, the robot having: a drive link driven by a motor; a plurality of passive links driven by a motion of the drive link; and a plurality of pairs respectively connected to the plurality of passive links, the abnormality detecting method comprising: executing a simulation in which the robot is moved along each of predetermined plural motion paths, and calculating a score with respect to each of the motion paths, wherein the score is increased when the paring elements of an objective pair collide with each other and the score is decreased when the paring elements of the pair other than the objective pair collide with each other, and wherein the objective pair is preliminarily designated among the plurality of pairs so as to judge as to whether or not the objective pair has the abnormal clearance; generating a robot motion for moving the robot along the motion path having the score not lower than a predetermined threshold, among the plurality of motion paths; measuring a drive torque or a current value of the motor when the robot is moved in accordance with the generated robot motion; calculating an index value based on a magnitude of variation of a value relating to the drive torque or the current value measured by the measuring section; and judging as to whether or not the abnormal clearance exists between the paring elements of the objective pair, based on a magnitude of the index value.

A further aspect of the present disclosure is an abnormality detecting method for detecting an abnormal clearance between paring elements of a pair connected to a passive link of a robot, the robot having: a drive link driven by a motor; a plurality of passive links driven by a motion of the drive link; and a plurality of pairs respectively connected to the plurality of passive links, the abnormality detecting method comprising: executing a simulation in which the robot is moved along each of predetermined plural motion paths, and determining a motion path among the plural motion paths, in which only the paring elements of an objective pair collide with each other when it is assumed that a clearance exists between the paring element of the objective pair, wherein the objective pair is preliminarily designated among the plurality of pairs so as to judge as to whether or not the objective pair has the abnormal clearance; generating a robot motion for moving the robot along the motion path determined by the simulation; measuring a drive torque or a current value of the motor when the robot is moved in accordance with the generated robot motion; calculating an index value based on a magnitude of variation of a value relating to the measured drive torque or the measured current value; and judging as to whether or not the abnormal clearance exists between the paring elements of the objective pair, based on a magnitude of the index value.

BRIEF DESCRIPTION OF THE DRAWINGS

The above and other objects, features and advantages of the present invention will be made more apparent by the following description of the preferred embodiments thereof, with reference to the accompanying drawings, wherein:

FIGS. 7a to 7c show a model of the ball joint.

FIGS. 9a and 9b show an example of an initial condition of a motion path of the robot.

DETAILED DESCRIPTIONS

Figure 1:
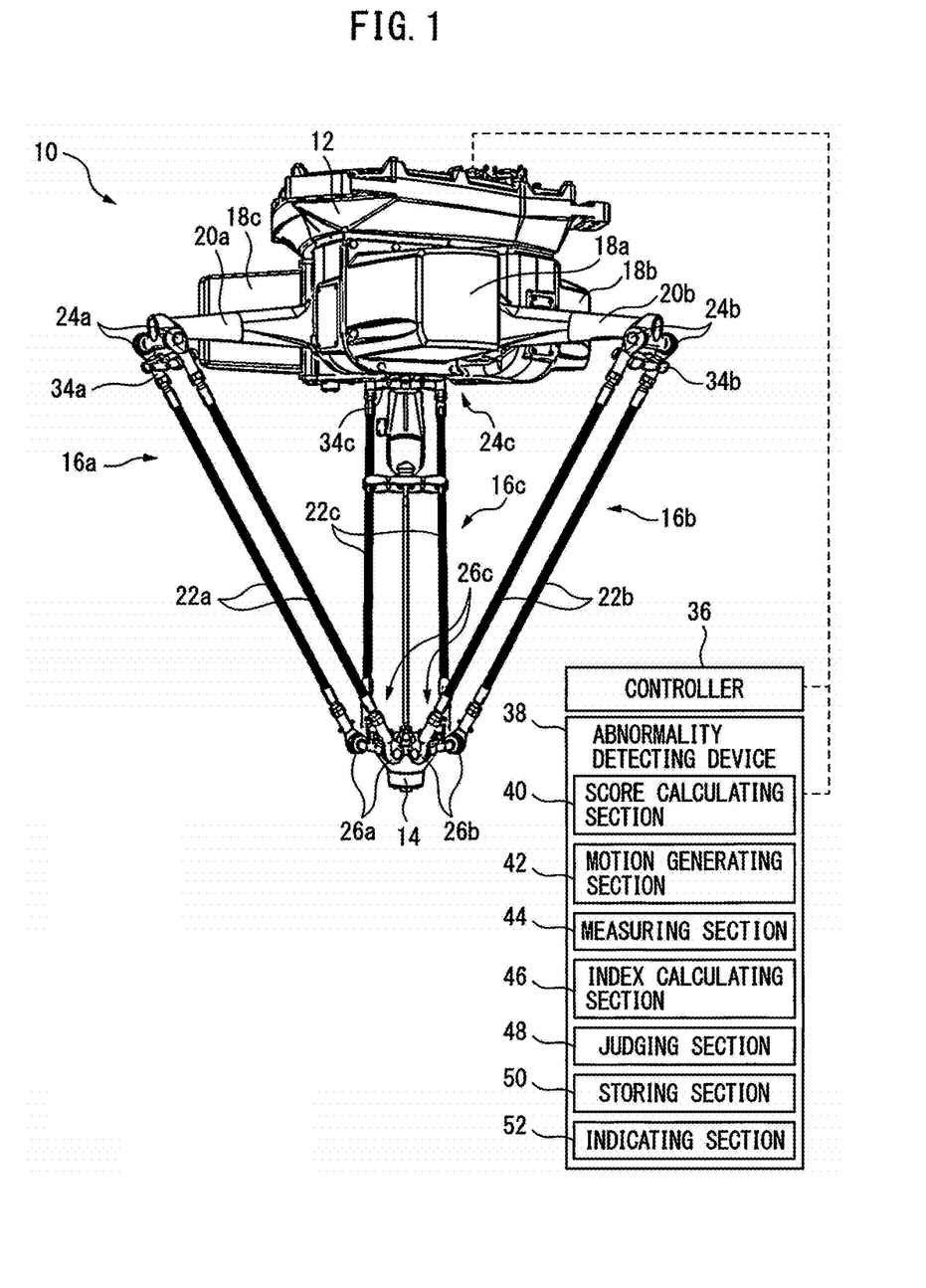
FIG. 1 is a view showing a schematic configuration of an abnormality detecting device according to a preferred embodiment, along with a delta-type parallel link robot, to which the abnormality detecting device can be applied.

FIG. 1 is a view showing schematic configurations of an abnormality detecting device according to a preferred embodiment of the present disclosure, and a delta-type parallel link robot, as a structural example to which the abnormality detecting device can be applied. Parallel link robot 10 (hereinafter, also be referred to as "robot") has a base part 12; a movable part 14 positioned away from (normally, positioned below) base part 12; two or more (in the illustrated embodiment, three) link parts 16a, 16b and 16c which connect movable part 14 to base part 12, each link part including one degree-of-freedom relative to base part 12; and a plurality of (normally the same number as the link parts, and in the illustrated embodiment, three) motors 18a, 18b and 18c which respectively drive link parts 16a, 16b and 16c. To movable part 14, an end effector (schematically shown in FIG. 3) such as a robot hand can be attached.

Link part 16a is constituted by a drive link 20a connected to base part 12 and a (sliding) pair of (two) passive links 22a which extend parallel to each other and connect drive link 20a to movable part 14. Drive link 20a and passive links 22a are connected to each other by a pair of (two) first joints 24a. Further, movable part 14 and passive links 22a are connected to each other by a pair of (two) second joints (or spherical joints) 26a. In this embodiment, both the first and second joints are formed as ball joints (or spherical joints).

Figure 2:
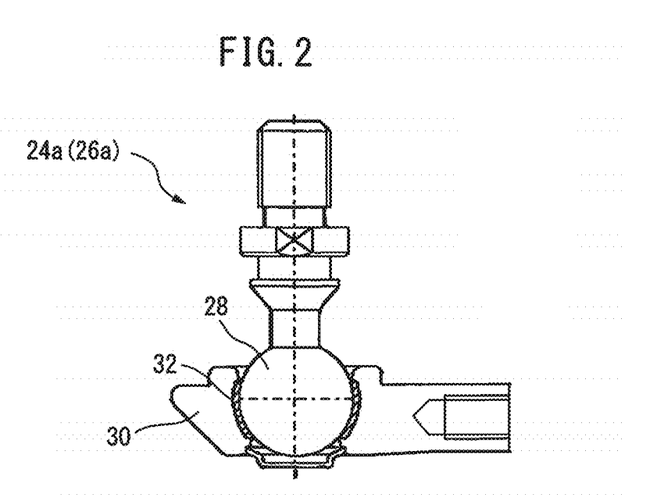
FIG. 2 is a partially enlarged view of a structure of each ball joint of the parallel link robot of FIG. 1.

FIG. 2 is a partially enlarged view of a structure (or a link ball structure) of each ball joint (in this case, ball joints 24a or 26a) of robot 10. Ball joint 24a (26a) has a ball 28 (or a convex surface), a housing 30 (or a concave surface) for containing ball 28, and a liner 32 positioned between ball 28 and housing 30. Further, as shown in FIG. 1, at the drive link side (or the upper part) of the passive links, robot 10 has a restraining plate 34a positioned and connected between the housings of first ball joints 24a so as to restrict a rotation of two parallel passive links 22a about each axis of the robot.

Other link parts 16b and 16c may have the same configuration as link part 16a. Therefore, the components of link parts 16b and 16c corresponding to the components of link part 16a are provided with respective reference numerals in which only the last character is different from the reference numeral of link part 16a (e.g., the components of link parts 16b and 16c corresponding to passive link 22a are provided with reference numerals 22b and 22c, respectively), and a detailed explanation thereof will be omitted.

As schematically shown in FIG. 1, a controller 36 configured to control parallel link robot 10 is connected to robot 10. Further, an abnormality detecting device 38, for detecting an abnormal clearance in the ball joint, has: a score calculating section 40 configured to execute a simulation in which robot 10 is moved along each of predetermined plural motion paths, and calculate a score (as explained below) with respect to each of the motion paths, wherein the score is increased when the paring elements (or joint elements) of an objective (sliding) pair (or an objective joint) collide with each other and the score is decreased when the paring elements of the pair other than the objective pair collide with each other, and wherein the objective pair is preliminarily designated among the plurality of (sliding) pairs (or the joints) so as to judge as to whether or not the objective pair has the abnormal clearance; a motion generating section 42 configured to generate a robot motion for moving robot 10 along the motion path having the score not lower than a first predetermined threshold, among the plurality of motion paths; a measuring section 44 configured to measure a drive torque or a current value of the motor when robot 10 is moved in accordance with the generated robot motion; an index calculating section 46 configured to calculate an index value (as explained below) based on a magnitude of variation of a value relating to the drive torque or the current value measured by measuring section 44; and a judging section 48 configured to judge as to whether or not the abnormal clearance exists between the paring elements of the objective pair, based on a magnitude of the index value.

Robot controller 36 is configured to generate a motion command for operating robot 10 based on the robot motion generated by motion generating section 42, and control each axis (or the motor thereof) of robot 10 based on the motion command. In addition, abnormality detecting device 38 may have: a storing section such as a memory configured to store data relating to the above motion paths, the calculated score and index value, and the first and second threshold, etc.; and a indicating section 52 such as a display configured to visually provide information relating to results of the above simulation and judgment, etc.

Abnormality detecting device 38 can be realized as an arithmetic processing unit such as a personal computer (PC) having a processor and a memory, etc., connected to robot controller 36. Although abnormality detecting device 38 is shown as a device separated from robot controller 36 in FIG. 1, device 38 may be incorporated in controller 36 as a processor and a memory, etc. Further, a part of the abnormality detecting function may be provided to a device such as a PC, and the other part may be provided to robot controller 36.

Figure 3:
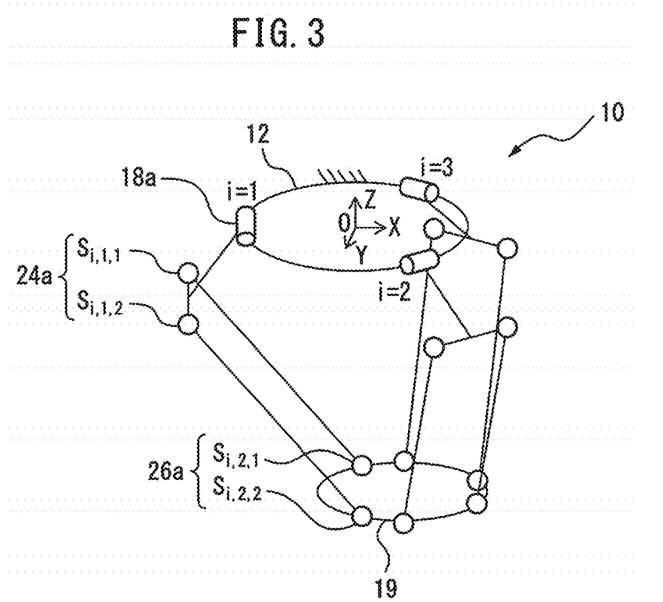
FIG. 3 is a view showing an example of a structural model of the parallel link robot.

FIG. 3 shows a structural model of parallel link robot 10 of FIG. 1. Parallel link robot 10 has a closed-loop link mechanism including three rotational drive sections (or motors) and twelve passive pairs (in this example, ball joints). In this example, the twelve ball joints are represented as $S_{i,j,k}$, and then, one ball joint among the twelve ball joints is preliminarily designated (by the operator, etc.) as an objective pair, wherein it should be detected as to whether or not an abnormal clearance (as explained below) is generated in the objective pair.

With reference to FIG. 2 again, in each joint, ball 28 slides on liner 32 due to the motion of robot 10. In many cases, in order to reduce a frictional resistance between ball 28 and liner 32, liner 32 is made from a low-friction material such as a resin, etc. In this regard, since liner 32 is abraded by repetition of the robot motion, a clearance (or an air gap) is generated between ball 28 and liner 32 (or housing 30). When the magnitude of the clearance is increased to a certain value, the positional accuracy of robot 10 may be deteriorated, and/or the amplitude of vibration due to the robot motion may be increased. Therefore, in the embodiment, it is judged as to whether or not the magnitude of the clearance is increased to the certain value (in other words, as to whether or not the abnormal (excessively large) clearance is generated).

Figure 4:
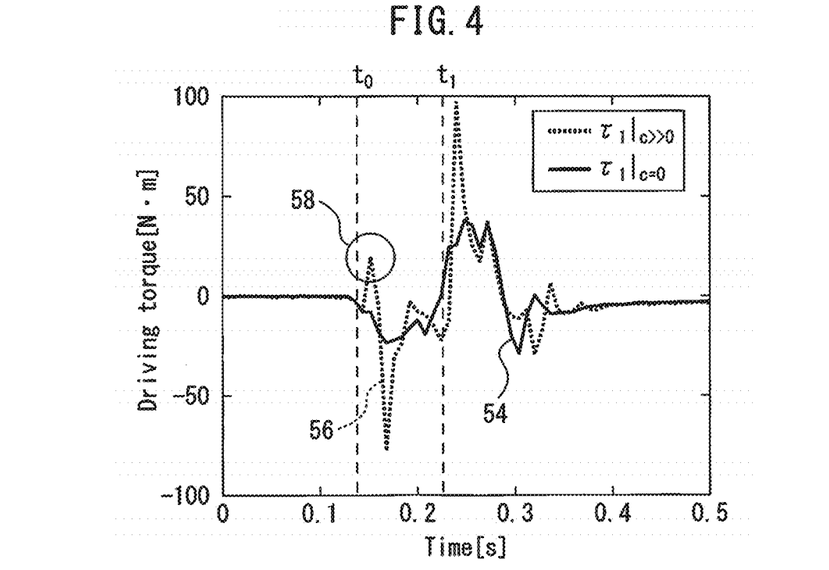
FIG. 4 is a graph showing a temporal change in a drive torque of a motor.

FIG. 4 is a graph showing an example of a temporal change in a measured value of a drive torque of the motor for driving the link. Concretely, a graph 54 indicates a normal state in which a clearance between the paring elements (in this case, the ball and the housing) can be ignored, and a graph 56 indicates an abnormal state in which the magnitude of an (abnormal) clearance is not smaller than a certain value.

In case when the clearance exists in one or more ball joint (spherical pair), when (a representative point such as the end effector of) the parallel link robot is moved along a predetermined motion path, either a sliding motion in which the paring elements (e.g., the ball and the housing) slide on each other, or a collisional motion in which the paring elements are separated from and then collide with each other occurs, in the spherical pair having the clearance. In the latter case (or the collisional motion), an impact force is generated, and then the impact force is transmitted to an actuator (e.g., the motor) for driving the link, via the intermediate link and/or the other bearing (e.g., the joint or pair). The inventor(s) of this case found that, as indicated by graph 56 of FIG. 4, the drive torque of the actuator (motor), to which the impact force is transmitted, is greatly changed or fluctuated when the abnormal clearance (having the magnitude not smaller than the certain value) is generated in one or more pair, relative to when the normal pair is used, and that the existence of the abnormal clearance can be judged by evaluating the magnitude of the change in the drive torque.

Concretely, first, in order to quantify the change in the drive torque value due to the collision between the paring elements, an index value (hereinafter, also referred to as an anomaly score) AS is used, which can be represented by following equation (1).

$$AS(\tau) \equiv \sum_{i=1}^{3} \left( \underset{t \in (t_0, t_1)}{\mathrm{RMS}} (\tau_i - \tau_i |_{c=0}) \right)^2 \quad (1)$$

In equation (1), $\tau_i$ represents the drive torque calculated by a monitor current of an i-th actuator, RMS represents a root-mean-square of a value in a time interval $(t_0, t_1)$, and "c" represents a vector constituted by the magnitudes of clearances of all spherical pairs. Further, "c=0" means that the clearances of all pairs are ideal (e.g., equal to zero). In this example, as time interval $(t_0, t_1)$, a period of time between before and after the acceleration as shown in FIG. 4 may be used. Equation (1) shows that, as the amount of change in the drive torque value when the paring elements collide with each other increases, the anomaly score increases, with respect to the drive torque value measured when there is no clearance in all of the pair.

In this regard, it is preferable that time points $t_0$ and $t_1$ for specifying time interval $(t_0, t_1)$ be set so that the time interval includes a time point (indicated by reference numeral 58) when the drive torque is changed due to the first collision between the paring elements. For example, time point $t_0$ may be set as a time point immediately before the first collision, and time point $t_1$ may be set a time point after 0.1 second from time point $t_0$, etc., so that time interval $(t_0, t_1)$ includes the first significant change in the drive torque. The time interval may be experimentally determined, otherwise, may be calculated or predicted, based on the magnitude of the clearance and the acceleration when the motion of the robot is initiated.

Figure 5:
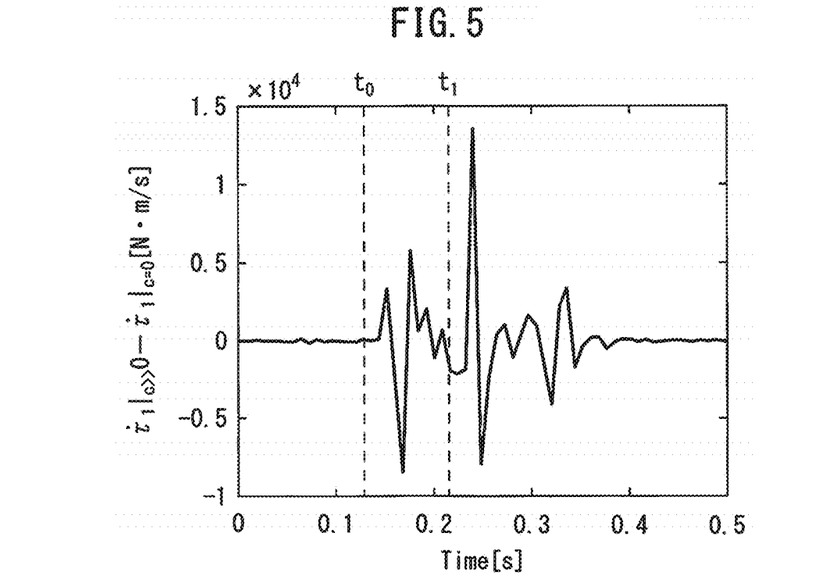
FIG. 5 is a graph showing a temporal change in a differential value of the drive torque of the motor.

Although drive torque ($\tau_i$) is used in equation (1), a time differential value of the drive torque may be used instead. FIG. 5 shows a graph of an example of a relationship between the time and the time differential value of the drive torque. Also, the graph of FIG. 5 indicates the difference between the normal state and the abnormal state. In either FIG. 4 or FIG. 5, the change in the drive torque can be detected, and thus the preferable index value for judging the presence or absence of the abnormal clearance can be obtained. In general, the collision between the paring elements can be easily detected when the time differential value is used, relative to when the drive torque value is used.

Instead of the value relating to the drive torque (in this case, the drive torque value and the time differential value of the drive torque), a value relating to a current of the motor (e.g., a motor current value or a time differential value thereof) may be used. In general, the drive torque is proportional to the current value, and thus the similar explanation regarding FIG. 4 or 5 can also be applied to the case in which the value relating to the current value is used.

Hereinafter, an example of a procedure in the abnormality detecting device (i.e., an abnormality detecting method) according to the embodiment will be explained, with reference to a flowchart of FIG. 6. First, in step S1, the operator selects or designates a (preferably, one) pair as the objective pair, among the twelve pairs (or the ball joints), wherein it should be judged as to whether or not the abnormal clearance is generated in the objective pair. In this example, the designated objective pair is represented as $S_{i', j', y''}$.

In the next steps S2 to S10, a motion path of the robot suitable for detecting the abnormal clearance is determined, and the robot motion corresponding to the determined motion path is generated. In this example, in order to judge the pair having the abnormal clearance, a motion path (of a representative point of the robot) in which only the paring elements of the objective pair collide with each other or a motion path close thereto is calculated or generated by a simulation, assuming that the clearance exists between the paring elements (in this case, the ball and the housing) of the objective pair. In other words, in the generated robot motion, the paring elements of all or a majority of the pairs other than the objective pair perform a sliding motion as explained below, even when the clearance exists in the pair other than the objective pair. Such a robot motion can be calculated by the following procedure.

In step S2, score calculating section 40, etc., randomly (or arbitrarily) selects the motion path to which a score as explained below will be added, among a predetermined (or stored in storing section 50, etc.) plurality of motion paths. In this example, an initial condition of the arbitrary motion path is defined by using a position (or coordinate) x, a velocity $\dot{x}$ and an acceleration $\ddot{x}$ of the end effector of the robot in a stationary coordinate system, etc., and the defined initial condition may be represented by following equation (2). In equation (2), "W" represents a working area of the robot, and "$R^3$" represents a real three-dimensional space. In this regard, the acceleration of the robot has an upper limit, and hereinafter, the upper limit is represented by "$a_{max}$". In addition, "T" represents an initial value of the motion path of the robot clarified by the initial condition, and hereinafter, the initial value may be referred to as merely the "path".

$$\dot{x}_0 = 0 \Rightarrow T(x_0, \ddot{x}_0) \in (W, R^3) \quad (2)$$

Figures 7A, 7B:
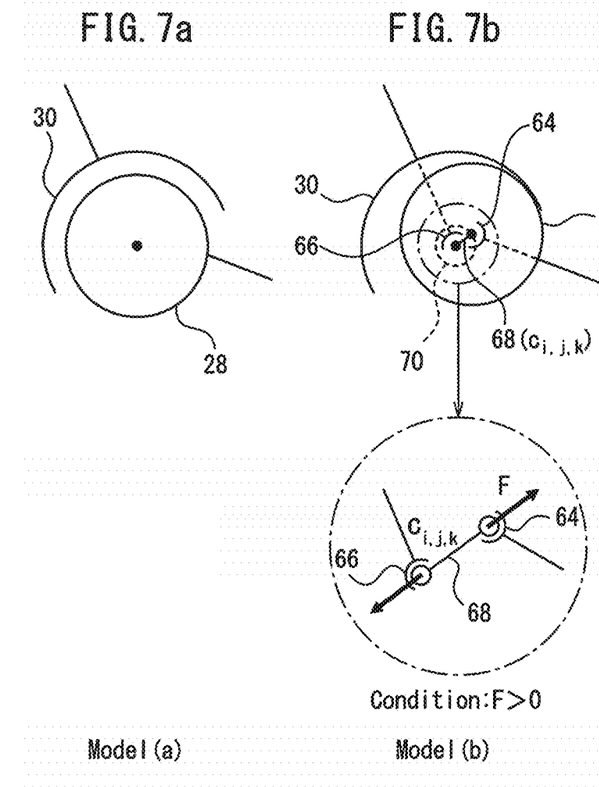
FIG. 7a shows a state in which there is no clearance between pairing elements.
FIG. 7b shows a state in which there is a clearance between the pairing elements and the paring elements slide on each other.
Figure 7C:
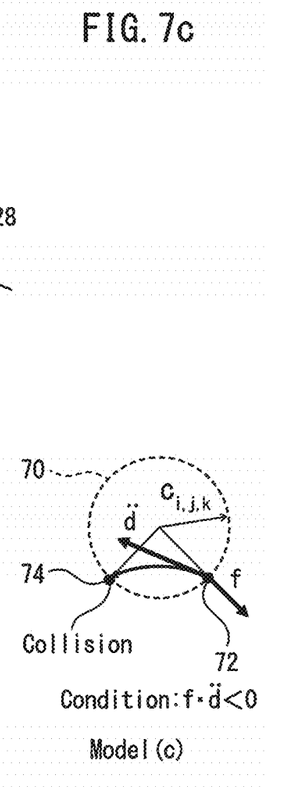
FIG. 7c shows a state in which there is a clearance between the pairing elements and the paring elements collide with or move away from each other.

In steps S3 to S6, the combinations of the presence or absence of the clearance of the passive pairs (in this example, $2^{12}$ combinations, since there are twelve joints) and the initial condition of the path are provided, and then, the initial action of the pair having the clearance, when the robot is moved along the selected motion path, is calculated by the simulation. In this case, as a model of the spherical pair, three types of models (a) to (c) are considered, as shown in FIGS. 7a to 7c, respectively. In the drawings, $S_{i,j,k}$ represents the clearance in the radial direction of pair $S_{i,j,k}$. In addition, in these models, a frictional force between the paring elements is not considered.

In step S3, model (a) is applied to the pair to which the clearance is not provided, and model (b) is temporarily applied to the pair to which the clearance is provided. To model (a), an ideal constraint condition ($c_{i,j,k}=0$) in which there is no clearance between the paring elements (ball 28 and housing 30) is applied. On the other hand, a constraint condition ($c_{i,j,k}>0$) in which there is a clearance between the paring elements is applied to model (b), and the paring elements slide on each other in model (b).

In model (b), at the centers of the joint elements (ball 28 and housing 30), spherical pairs 64 and 66, each having ignorable size, are virtually positioned, respectively. It is assumed that spherical pairs 64 and 66 are connected to each other by a virtual link 68 (corresponding to $c_{i,j,k}$) having no mass. In the stationary state, virtual link 68 is directed or orientated so that spherical pairs 64 and 66 at the both ends of the link are positioned on a line of action of a pair acting force F. As the result of the simulation of the action of the pair based on the initial condition of the selected path, in case when a tensile force is applied to the virtual link in the stationary state (i.e., in case that the magnitude of pair acting force F larger than zero where the tensile direction is used as positive), the center of ball 28 (or spherical pair 64) moves along a virtual circle 70 relative to the center of housing 30 (or spherical pair 66). In other words, ball 28 does not move away from or collide with housing 30, instead, slides on housing 30. Therefore, model (b) representing the sliding motion should satisfy a condition in which pair acting force F as explained above is larger than zero.

On the other hand, to model (c), a constraint condition ($c_{i,j,k}>0$) in which there is a clearance between the paring elements is applied, and the paring elements move away from and collide with each other in model (c). A condition applied to model (c) is that, as the result of the simulation of the action of the pair based on the initial condition of the selected path, an inner product of pair acting force F when ball 28 is stationary with respect to housing 30 and an acceleration $\ddot{d}$ of ball 28 relative to housing 30 is lower than zero (i.e., the vectors of force F and acceleration $\ddot{d}$ constitute an obtuse angle). In this case, unlike model (b), the center of ball 28 (or spherical pair 64) does not move along virtual circle 70 relative to the center of housing 30 (or spherical pair 66). Instead, in model (c), the center of ball 28 separates from one point 72 on virtual circle 70, moves an inner area of circle 70, and then reaches another point 74 on circle 70. As a result, ball 28 collides with housing 30.

Next, in order to simulate the action of the pair when (the end effector, etc., of) the robot is moved along the motion path selected in step S2, a motion equation with respect to the position and posture of each link is solved in consideration of an input torque and a gravity force (step S4), and a condition, which each of models (b) and (c) of the pair including the clearance should satisfy, is delivered (step S5). Next, in step S6, it is judged as to whether or not the delivered condition is satisfied with respect to each pair having the clearance. Then, if there is any pair in which the delivered condition is not satisfied, model (b) is replaced with model (c) or vice versa in the same pair (step S7), and then the calculation of step S4 is executed again. As described above, in step S3, model (b) is temporarily applied to all of the pairs having the clearance. Then, by virtue of the procedure of steps S4 to S7, model (c) is applied to the pair in which the condition of model (b) is not satisfied. Therefore, in the selected path, consistent models can be applied to all of the pairs.

Next, in step S8, a score (Sc value) of the selected motion path is calculated, and the calculated score is stored in storing section 50, etc. In this regard, the score (Sc) is an index value which is larger when model (c) is applied to the objective pair (joint) designated in step S1 than when model (b) is applied to the objective pair, and is smaller when model (c) is applied to the pairs other than the objective pair than when model (b) is applied to the pairs other than the objective pair. For example, the score (Sc) may be represented by using following equation (3).

$$Sc \equiv 1 + \sum_{\substack{i=1,2,3 \\ j=1,2 \\ k=1,2 \\ c \in \{0,1\}^{12}}} u \qquad (3)$$

Figure 8:
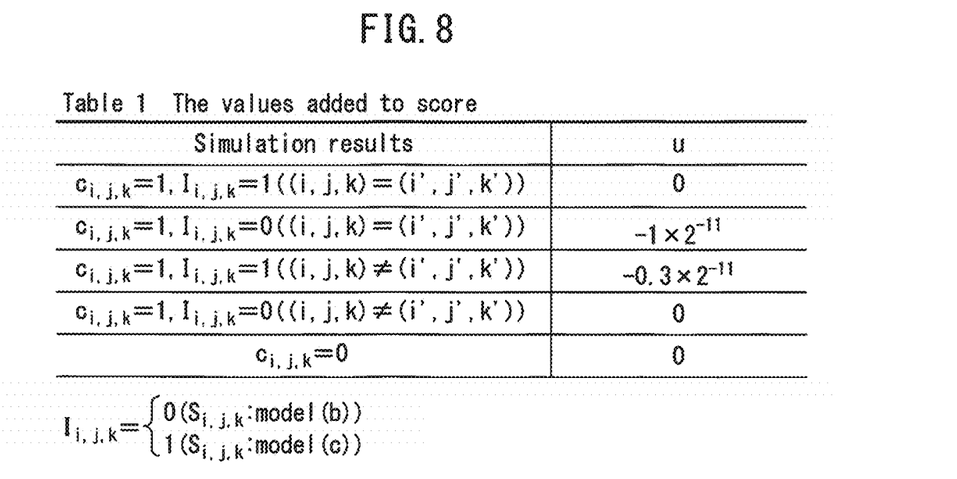
FIG. 8 is a view showing an example of a parameter used to calculate a score in tabular form.

FIG. 8 shows an example of a value "u" in equation (3) in tabular form. The value "u" becomes zero when model (c) is applied to the objective pair, or when model (b) is applied to the pair, other than the objective pair, which is determined to have the clearance. Further, the value "u" becomes a negative value when model (b) is applied to the objective pair, or when model (c) is applied to the pair, other than the objective pair, which is determined to have the clearance. In this example, it is important that the collisional motion occurs in the objective pair, and thus an absolute value of the negative value "u" is larger in the former case than the latter case. However, the value "u" as explained above is merely an example, and thus the value "u" may be properly determined or changed in view of consistency with the actually measured value, etc., as explained below.

In the example indicated by equation (3) and FIG. 8, the maximum value of the score is one (1). In other words, in the motion path having the score of one, only the paring elements of the objective pair collide with each other, without depending on as to whether each of the other pairs have the clearance or not. Therefore, when the robot is moved along the motion path having the score of one, the collisional motion occurs only in the objective pair, and the sliding motion occurs in the pairs other than the objective pair, even if the pair other than the objective pair has the clearance.

The above score is calculated with respect to all of the motion paths which are preliminarily and randomly selected (step S9). After the score has been calculated for all of the motion paths, an optimum motion path is determined based on the calculated scores (step S10). By adding the scores to the plurality of motion paths, suitability of each motion path for detecting the clearance of the objective pair can be quantitatively judged or compared to each other.

In step S10, the optimum motion path may be determined by comparing the calculated scores to a predetermined first threshold (e.g., 0.7, 0.8 or 0.9). By determining at least one motion path having the score not smaller than the first threshold, the robot motion, in which the collision occurs only in the objective pair, or the similar motion path, can be generated. As explained above, the motion path having the score of one is ideal, and thus one simple way is to select one motion path having the score of one or the highest score. However, depending on which pair is designated as the objective pair, the motion path having the score of one may not be obtained. Therefore, it is preferable that the first threshold smaller than one be set or predetermined, as described above. In addition, the magnitude of the impact force generated by the collision between the paring elements may not be a constant value, and thus, depending on the size of the clearance, the change in the drive torque or the current value may not be detected. Accordingly, the plurality of motion paths each having the score larger than the first threshold may be determined as the optimum motion paths, and a procedure as explained below may be applied to each of the determined motion paths.

Alternatively, in step S10, instead of determining the one or more motion path each having the score larger than the first threshold, another optimum procedure may be used, which is exemplified by following equation (4). First, the plurality of motion paths are classified into groups A and B, based on a magnitude relationship between each score and a first threshold $Sc_{th}$. Then, among the motion paths belonging in group A (i.e., the motion paths each having the score not lower than threshold $Sc_{th}$), a motion path, which is farthest in distance from the motion paths belonging in group B (i.e., the motion paths each having the score lower than threshold $Sc_{th}$), is determined. In this regard, groups A and B in equation (4) may be defined by equation (5). In addition, "d(T, T')" in equation (4) represents a distance between two motion paths included in a set $(W, R^3)$ of all motion paths, and can be calculated by equation (6). Further, "r" in equation (6) is a scale factor relating to the acceleration and the displacement.

$$T_{i,j,k} \equiv \underset{T \in A}{\mathrm{argmax}} \underset{T' \in B}{\inf} d(T, T') \quad (4)$$

$$A \equiv \{Sc \geq Sc_{th}\}, B \equiv \{Sc < Sc_{th}\} \quad (5)$$

$$d(T, T') = d((x_0, \ddot{x}_0), (x'_0, \ddot{x}'_0)) \equiv \sqrt{\|x'_0 - x_0\|^2 + (r\|\ddot{x}'_0 - \ddot{x}_0\|)^2} \quad (6)$$

By virtue of the optimization by using equations (4) to (6), among the motion paths each having the score not lower than the first threshold (group A), a motion path, which is farthest in distance from the motion paths each having the score lower than the first threshold (group B), can be determined. Alternatively, among the motion paths of group A, a motion path, which is separated from the motion paths of group B, may be determined. Such optimization is effective in order to avoid that the pattern of spherical pairs in which the collision occurs is varied (in other words, the score is significantly changed) due to a slight change in the motion path. Therefore, this optimization is more robust than the method of simply determine the motion path having the highest score or the score not lower than the first threshold.

Figure 9A:
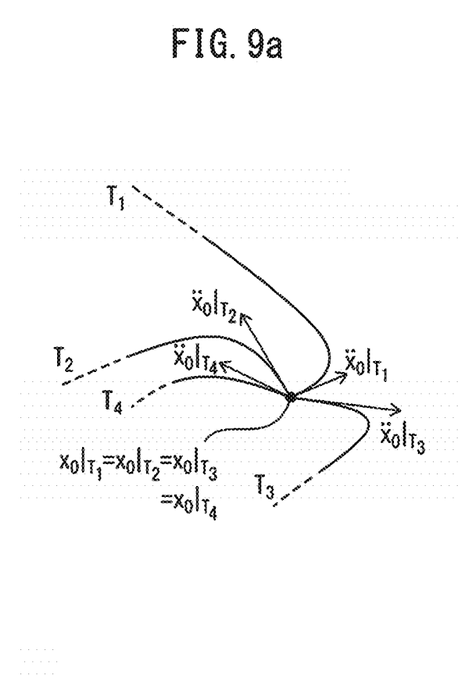
FIG. 9a shows four paths each having a predetermined position as a start point.
Figure 9B:
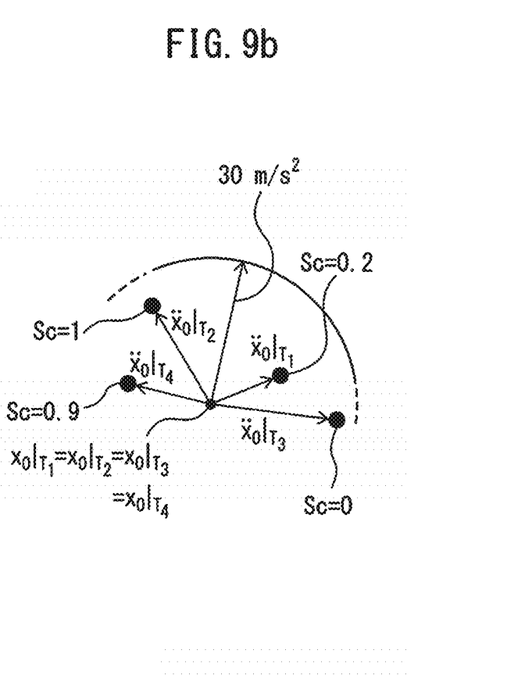
FIG. 9b shows a state in which the score is calculated and added to each path.

FIGS. 9a and 9b show an example in which the optimum motion path for judging the clearance of the objective pair is determined, by using the above optimization procedure. In the parallel link robot as shown in FIG. 1, with respect to the randomly selected motion paths which start from a position $x_0$, wherein $a_{max}$=30 m/s², $Sc_{th}$=0.7, r=0.003 s², it has been checked as to whether there is a motion path in which the collision occurs only in the specified spherical pair, or a motion path similar thereto. In this regard, FIG. 9a shows four motion paths $T_1$ to $T_4$, in which the representative point of the robot is stationary at position $x_0$ (i.e., the velocity of the representative point is zero), and then starts to move at acceleration $\ddot{x}_0$.

When the score of each motion path is calculated as shown in FIG. 9b, paths $T_2$ and $T_4$ belong to group A as explained above, and paths $T_1$ and $T_3$ belong to group B as explained above. In the method of simply selecting the motion path having the highest score, path $T_2$ is determined as the optimum motion path. On the other hand, in the optimization method as explained above, among the motion path in group A, path $T_4$ or the path which is farthest in distance from the motion paths in group B is determined as the optimum motion path.

In FIGS. 9a and 9b, four motion paths starting from the specified one point $(x_0)$ are illustrated. However, another motion path starting from point $x_0$ may be further selected, and/or a plurality of motion paths starting from a position other than point $x_0$ may be selected. For example, hundreds of thousands of or millions of motion paths may be randomly selected, and then the score may be calculated for or added to each of the selected motion paths.

Figure 6:
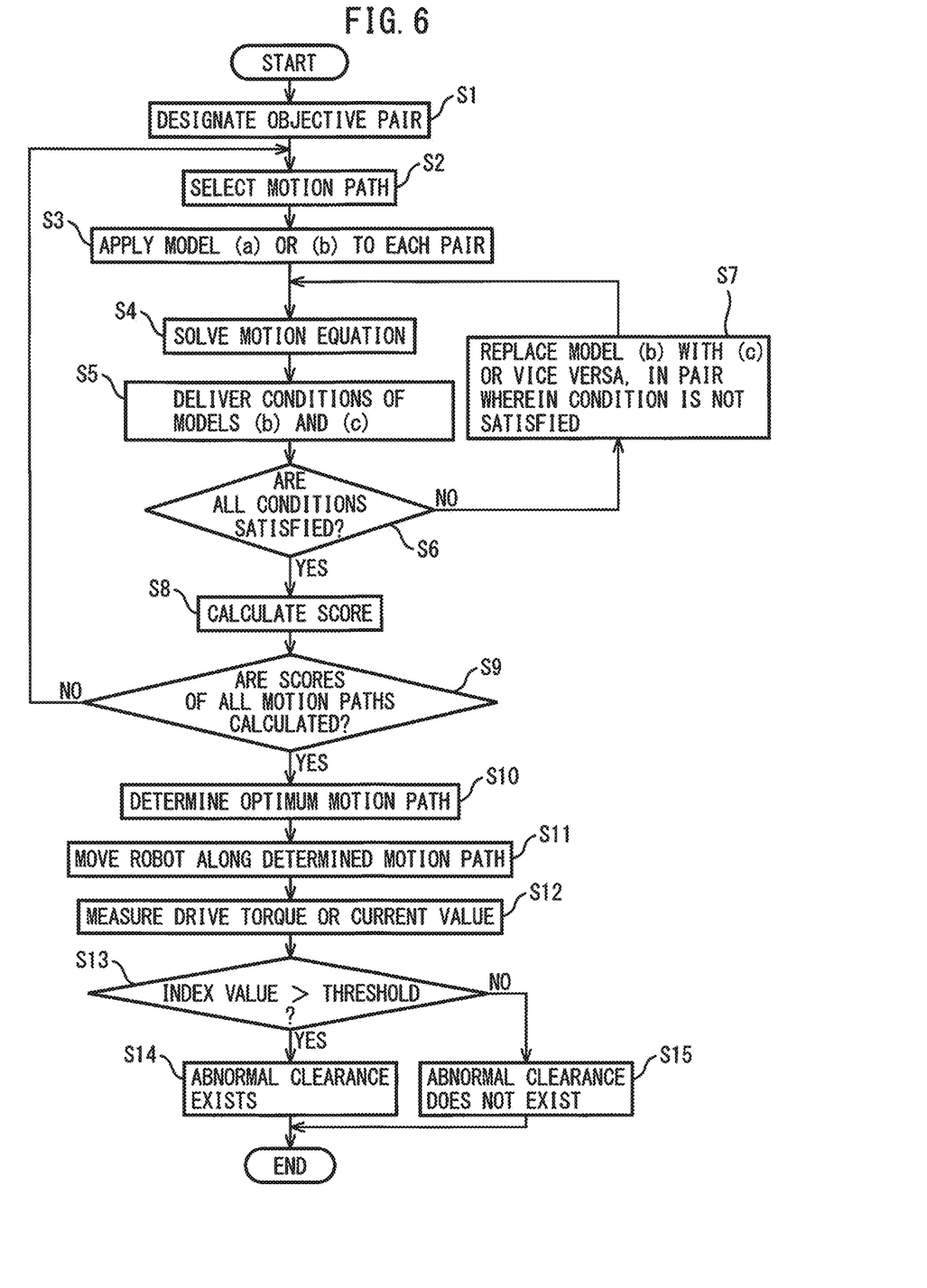
FIG. 6 is a flowchart showing an example of an abnormality detecting method according to a preferred embodiment.

Steps S8 and S9 in FIG. 6 may be omitted, depending on the result of the procedures (or the simulation) of steps S4 to S7. For example, as a result of the simulation (or the procedure of step S4 to S7), when, in a certain motion path, the collision occurs (i.e., model (c) is applied) only in the objective pair and the sliding motion occurs (i.e., model (b) is applied) in all pairs other than the objective pair, the motion path may be determined as the optimum motion path, without calculating the scores. In this case, score calculating section 40 functions as the simulation executing section.

With reference to FIG. 6 again, controller 36 generates a robot motion (or a motion command) for moving the robot along the optimum motion path determined in step S10, and actually moves the robot based on the robot motion (step S11), and the drive torque or the current value of the motor when the robot is moved is measured (step S12). As measuring section 44 for measuring the drive torque or the current value of the motor, a conventional device such as a torque sensor or an ammeter may be used, and thus the detailed explanation thereof is omitted.

Next, the index value (or the anomaly score) calculated based on the measured drive torque or the current value is compared to a predetermined second threshold as explained below (step S13), and when the index value exceeds the second threshold, it is judged that the objective pair includes an abnormal (or a certain size or more) clearance (steps S14 and S15).

The procedure as shown in FIG. 6 can be properly executed, either when abnormality detecting device 38 is integrally with robot controller 36 or when device 38 is a separate unit such as a personal computer (PC). For example, when an arithmetic processing unit such as a PC is connected to robot controller 36, above steps S1 to S10 may be executed by the arithmetic processing unit, and steps S11 to S15 may be executed by robot controller 36. In such a case, the arithmetic processing unit and a component of robot controller 36 (a processor and a memory, etc.) for executing steps S11 to S15 may be included in the abnormality detecting device according to the present disclosure.

Figure 10:
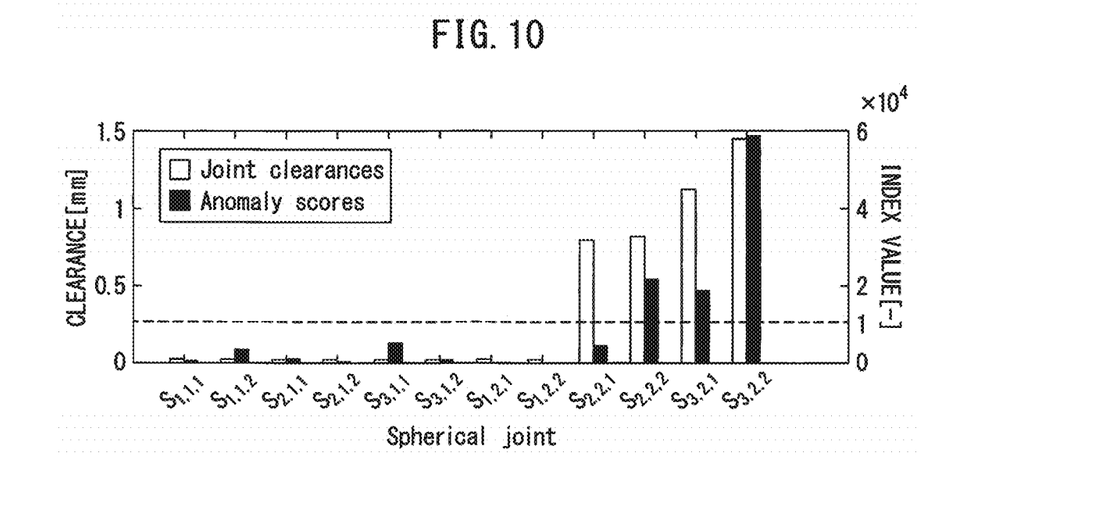
FIG. 10 is a graph in which a detection result of an abnormal clearance in a specified pair according to a preferred embodiment is compared to an actual measured value.

FIG. 10 shows a result of an experiment in which a clearance is actually added to a joint of an actual delta-type parallel link robot as exemplified in FIG. 1, in order to verify that the presence or absence of the clearance can be appropriately judged by the determined motion path. In this experiment, as indicated by white bar graphs, an excessively large clearance (such as 0.8 mm to 1.5 mm) was given to each of four joints ($S_{2,2,1}$, $S_{2,2,2}$, $S_{3,2,1}$ and $S_{3,2,2}$), and the other eight joints were set as ideal joints each having no clearance or an ignorable clearance. In this example, the optimum motion path was determined with respect to each of the twelve joints when the corresponding joint was set as the objective joint, the robot was actually moved along the determined motion path, and the above index value (or the anomaly score) was calculated based on the measured current value of the motor. In addition, as the current value of the motor (or the actuator) used to calculate the anomaly score, a (monitored) value of a current sensor arranged in the robot controller was used.

Black bar graphs in FIG. 10 indicate the calculated anomaly scores (dimensionless values). As shown in FIG. 10, when the second threshold to be compared to the anomaly score is set to $1 \times 10^4$, the judgment matching the actual condition can be carried out, with respect to three of the four joints actually having the excessively large clearance. As such, by appropriately setting the second threshold, it can be reasonably accurately judged as to whether or not the objective pair has the abnormal clearance.

As explained in step S10, in judging the presence or absence of the abnormal clearance in the objective pair, one or more motion path may be determined as the optimum motion path along which the robot is actually moved. When the plural motion paths are determined as the optimum motion paths, the result of the judgment (i.e., the magnitude relationship between the index value and the second threshold) may be different in each motion path. In such a case, in view of safety, it is preferable that it be judged that the abnormal clearance is generated in the objective pair when the calculation result in at least one optimum motion path indicates that the index value exceeds the second threshold. In this embodiment, as an example for judging the presence or absence of the abnormal clearance between the paring elements based on the magnitude of the index value, the magnitude relationship between the index value and the second threshold is explained, while the other method may be used. For example, in a certain pair, the lastly calculated index value and the past index value may be compared, and when the difference between the compared index values exceeds a predetermined threshold, it may be judged that the abnormal clearance is generated in the same pair. As the past index value, one index value immediately before the lastly calculated index value may be used, or an average value of the plurality of calculated index values in the past may be used.

In the embodiment as explained above, the motion path, in which the collisional motion occurs only in the objective pair, or the motion path similar thereto, is automatically determined among the large number of motion paths by the simulation, and the robot can be actually moved along the motion path. Then, when the change in the drive torque or the current value as shown in FIG. 4 or 5 occurs, it can be judged that the objective pair has the abnormal clearance. Further, by repeating the similar procedure after switching the objective pair, the presence or absence of the abnormal clearance can be judged with respect to all of the joints included in the robot. Therefore, the joint to be repaired or exchanged can be effectively identified.

In the embodiment, although the parallel link robot is explained as a robot to which the abnormality detecting device and the abnormality detecting method of the present disclosure can be applied, the object to which the device and the method can be applied is not limited as such. As another preferable example to which the abnormality detecting device and the abnormality detecting method of the present disclosure can be applied, a robot at least partially having a closed-loop link mechanism, as schematically shown in FIG. 11 or 12.

Figure 11:
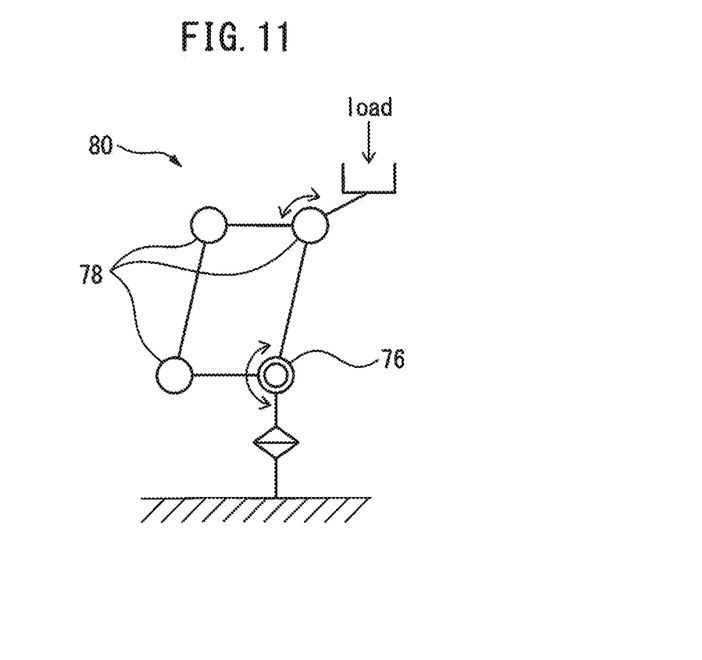
FIG. 11 is a view showing another structural example to which the embodiment can be applied.
Figure 12:
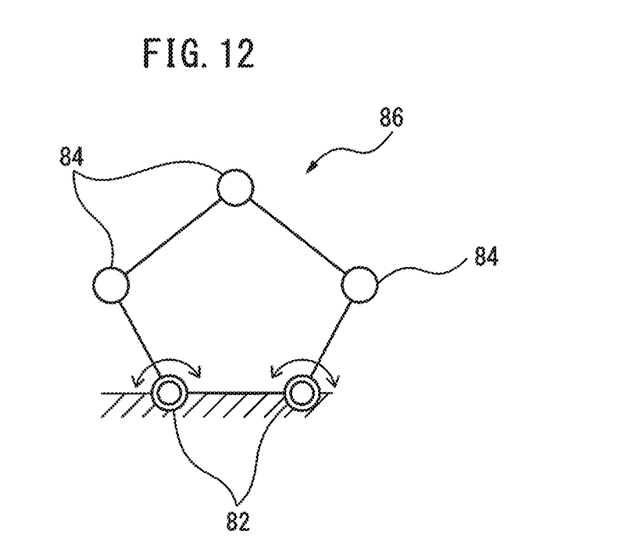
FIG. 12 is a view showing still another structural example to which the embodiment can be applied.

FIG. 11 shows a robot 80 having a drive joint section 76 including two drive joints, and a planar link mechanism including three passive joints 78, in which a load can be applied to a front end of the robot. On the other hand, FIG. 12 shows a robot 86 configured to be used as positioning device, etc., having a five-jointed link mechanism including two drive joints 82 and five passive joints 84. These robots have, similarly to the parallel link robot as shown in FIG. 1, the drive link driven by the motor, the plurality of passive links driven by the motion of the drive link, and the plurality of sliding pairs respectively connected to the passive links. Therefore, also in the robot of FIG. 11 or 12, the joint (or the passive pair) having the abnormal clearance can be detected or identified.

In the embodiment, although the spherical joint (or the ball joint) is explained as a sliding pair (or a joint) to which the abnormality detecting device and the abnormality detecting method of the present disclosure can be applied, the object to which the device and the method can be applied is not limited as such. For example, the abnormality detecting device and the abnormality detecting method of the present disclosure can be applied to a hinge structure (or a rotational joint) having one degree-of-freedom. In such a case, the rotational joint (or the hinge structure) has, as the paring elements, a generally column member (or a convex portion) and a generally cylindrical member (or a concave portion) configured to fit with the column member. Also in such a hinge structure, an abnormal clearance may occur between the column member and the cylindrical member in the radial direction thereof, due to temporal deterioration (e.g., frictional wear of at least one of the column member, the cylindrical member, and a liner between the members), etc., of the hinge structure. Therefore, the abnormality detecting device and the abnormality detecting method of the present disclosure can also be applied to the hinge structure, etc.

According to the present disclosure, the presence or absence of the abnormal clearance in the pair (joint) of the robot can be easily and correctly estimated, and the pair having the abnormal clearance can be easily and correctly identified.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An abnormality detecting method for detecting an abnormal clearance between a pair of joints a robot, the abnormal clearance exceeding a predetermined clearance between the pair of joints of the robot at a normal state, the robot having:
    a drive link driven by a motor;
    a plurality of passive links including a pair of passive links and driven by a motion of the drive link; and
    a plurality of pairs of joints including the pair of joints connected to the pair of passive links,
the abnormality detecting method comprising:
    executing a simulation in which the robot is moved along each of a plurality of predetermined motion paths;
    determining, among the plurality of predetermined motion paths, a motion path in which only the pair of joints collide with each other;
    generating a robot motion for moving the robot along the motion path determined by the simulation;

measuring a drive torque or a current value of the motor when the robot is moved in accordance with the generated robot motion;

calculating an index value based on a magnitude of variation of a value relating to the measured drive torque or the measured current value; and judging as to whether or not the abnormal clearance exists between the pair of joints, based on a comparison between a magnitude of the index value and a predetermined value.

2. An abnormality detecting method for detecting an abnormal clearance between a first pair of joints of a robot, the abnormal clearance exceeding a predetermined clearance between the first pair of joints of the robot at a normal state, the robot having:

a drive link driven by a motor;

a plurality of passive links including first and second pairs of passive links and driven by a motion of the drive link; and a plurality of pairs of joints including:
the first pair of joints connected to the first pair of passive links, and
a second pair of joints connected to the second pair of passive links, the abnormality detecting method comprising:
executing a simulation in which the robot is moved along each of a plurality of predetermined motion paths;
calculating a score with respect to each of the plurality of motion paths, wherein
the score is increased when the first pair of joints collide with each other, and
the score is decreased when the second pair of joints collide with each other;
generating a robot motion for moving the robot along a specific motion path having the score not lower than a predetermined threshold, among the plurality of motion paths;
measuring a drive torque or a current value of the motor when the robot is moved in accordance with the generated robot motion;
calculating an index value based on a magnitude of variation of a value related to the measured drive torque or the measured current value; and
judging as to whether or not the abnormal clearance exists between the first pair of the joints, based on a comparison between a magnitude of the index value and a predetermined value.

3. An abnormality detecting device for detecting an abnormal clearance between of a pair of joints of a robot, the abnormal clearance exceeding a predetermined clearance between the pair of joints of the robot at a normal state, the robot having:

a drive link driven by a motor;

a plurality of passive links including a pair of passive links and driven by a motion of the drive link; and a plurality of pairs of joints including the pair of joints connected to the pair of passive links, the abnormality detecting device comprising:
a simulation executing section configured to:
execute a simulation in which the robot is moved along each of a plurality of predetermined motion paths, and
determine, among the plurality of motion paths, a motion path in which only the pair of joints collide with each other;

a motion generating section configured to generate a robot motion for moving the robot along the motion path determined by the simulation executing section;

a measuring section configured to measure a drive torque or a current value of the motor when the robot is moved in accordance with the generated robot motion;

an index calculating section configured to calculate an index value based on a magnitude of variation of a value related to the drive torque or the current value measured by the measuring section; and a judging section configured to judge as to whether or not the abnormal clearance exists between the pair of the joints, based on a comparison between a magnitude of the index value and a predetermined value.

4. An abnormality detecting device for detecting an abnormal clearance between a first pair of joints of a robot, the abnormal clearance exceeding a predetermined clearance between the first pair of joints of the robot at a normal state, the robot having:

a drive link driven by a motor;

a plurality of passive links including first and second pairs of passive links and driven by a motion of the drive link; and a plurality of pairs of joints including:
the first pair of joints connected to the first pair of passive links, and
a second pair of joints connected to the second pair of passive links, the abnormality detecting device comprising:
a score calculating section configured to:
execute a simulation in which the robot is moved along each of a plurality of predetermined motion paths, and
calculate a score with respect to each of the plurality of motion paths,
wherein
the score is increased when the first pair of joints collide with each other, and
the score is decreased when the second pair of joints collide with each other;

a motion generating section configured to generate a robot motion for moving the robot along a specific motion path having the score not lower than a predetermined threshold, among the plurality of motion paths;

a measuring section configured to measure a drive torque or a current value of the motor when the robot is moved in accordance with the generated robot motion;

an index calculating section configured to calculate an index value based on a magnitude of variation of a value related to the drive torque or the current value measured by the measuring section; and a judging section configured to judge as to whether or not the abnormal clearance exists between the first pair of joints, based on a comparison between a magnitude of the index value and a predetermined value.

5. The abnormality detecting device as set forth in claim 4, wherein the motion generating section is configured to:
classify the plurality of motion paths into a first group and a second group based on magnitude relationships between the threshold and respective scores, the first group including the motion paths each having the score not lower than the threshold and the second group including the motion paths each having the score lower than the threshold, and
generate the robot motion corresponding to the specific motion path among the first group, the specific motion path being farthest from a motion path of the second group, or being separated from the motion path of the second group by a distance not shorter than a predetermined distance.

6. The abnormality detecting device as set forth in claim 1, wherein the motion generating section is configured to generate the robot motion corresponding to the motion path having the highest score.

7. The abnormality detecting device as set forth in claim 4, wherein the index calculating section is configured to calculate the index value based on a magnitude of variation of a time differential value of the drive torque or a magnitude of variation of a time differential value of the current value.

8. The abnormality detecting device as set forth in claim 1, wherein the drive link and the first and second passive links constitute at least one closed-loop link.

* * * * *